April 23, 1940.  R. DALLY  2,197,967

SOUND REPRODUCING APPARATUS

Filed June 27, 1938 6 Sheets-Sheet 1

Inventor:
Roy Dally
By Williams, Bradbury, McCaleb & Hinkle
Attys.

April 23, 1940.  R. DALLY  2,197,967
SOUND REPRODUCING APPARATUS
Filed June 27, 1938  6 Sheets-Sheet 2

Inventor:
Roy Dally
By Williams, Bradbury
McCaleb & Hinkle
Attys.

April 23, 1940.　　　　　R. DALLY　　　　　2,197,967
SOUND REPRODUCING APPARATUS
Filed June 27, 1938　　　　6 Sheets-Sheet 5

Inventor:
Roy Dally
By Williams, Bradbury, McCaleb & Hinkle
Attys.

April 23, 1940.  R. DALLY  2,197,967
SOUND REPRODUCING APPARATUS
Filed June 27, 1938  6 Sheets-Sheet 6

Inventor:
Roy Dally
By Williams, Bradbury, McCaleb & Hinkle
Attys.

Patented Apr. 23, 1940

2,197,967

UNITED STATES PATENT OFFICE 2,197,967

SOUND REPRODUCING APPARATUS

Roy Dally, Racine, Wis., assignor, by mesne assignments, to Webster Electric Company, Racine, Wis., a corporation of Delaware Application June 27, 1938, Serial No. 216,027

9 Claims. (Cl. 179—100.41)

The present invention relates to sound reproducing apparatus, and is particularly concerned with improved constructions of phonographs including improved tone arms, pickups, and circuit therefor.

One of the objects of the invention is the provision of an improved sound reproduction apparatus which includes pickups of the crystal type adapted to give the best reproduction and minimum record wear, and to eliminate undesirable frequency responses.

Another object of the invention is the provision of an improved sound reproduction apparatus of high fidelity which is adapted to be used with conventional phonographs having a turntable and sound amplifier apparatus.

Another object is the provision of an improved sound reproduction apparatus of the class described which is adapted to make provision for bass compensation and which is adapted to provide compensation for heat effects.

Another object of the invention is the provision of an improved sound reproducing apparatus of the class described, by means of which practically perfect needle tracking can be secured.

Another object is the provision of an improved construction of tone arm which is adapted to effect a high fidelity sound reproduction, and which is adapted to be utilized with various types of pickups and other apparatus.

Another object is the provision of an improved tone arm construction by means of which provision is made for the support of the tone arm out of contact with the record when the needle has been removed, so that the tone arm can never drop upon the record and so that the tone arm may be made extremely light to diminish inertia and secure high fidelity reproduction.

Another object is the provision of an improved tone arm pivotal support by means of which the tone arm may be so mounted that it can be lifted up when installed on the phonograph to such a position that the bottom of the pickup can be inspected and the needle can be most conveniently inserted.

Other objects and advantages of the invention will be apparent from the following description and the accompanying drawings, in which similar characters of reference indicate similar parts throughout the several views.

Referring to the drawings, of which there are six sheets.

Figures 1, 2, 6, 7:
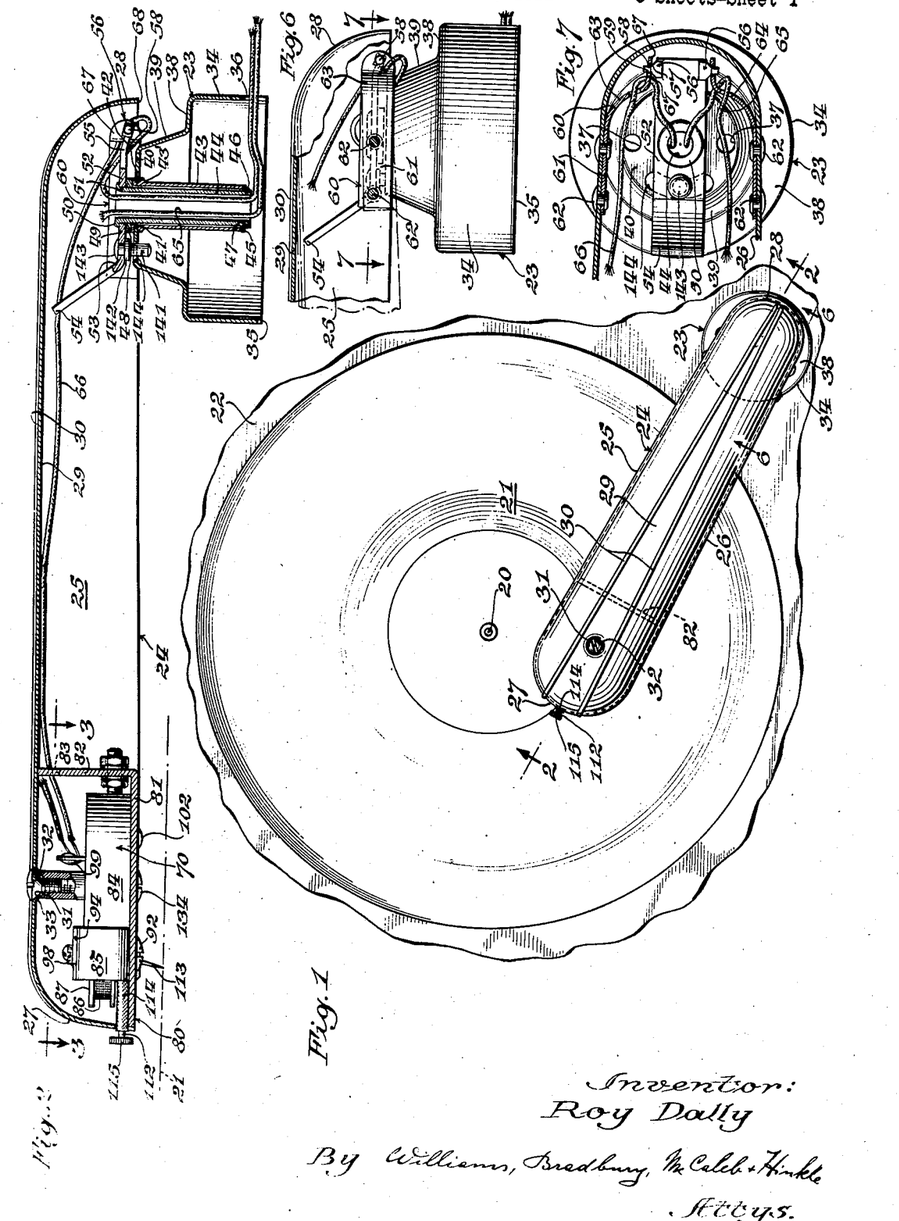
Fig. 1 is a fragmentary top plan view of a phonograph showing the turntable and tone arm constructed according to the invention, when the tone arm is equipped with a magnetic pickup.
Fig. 2 is a full sized vertical sectional view through the tone arm and its support, taken along the plane of the line 2—2 of Fig. 1.
Fig. 6 is a fragmentary side elevational view of the right end of the tone arm, taken on the plane of the line 6—6 of Fig. 1.
Fig. 7 is a horizontal sectional view taken on the plane of the line 7—7 of Fig. 6, looking in the direction of the arrows.
Figure 3:
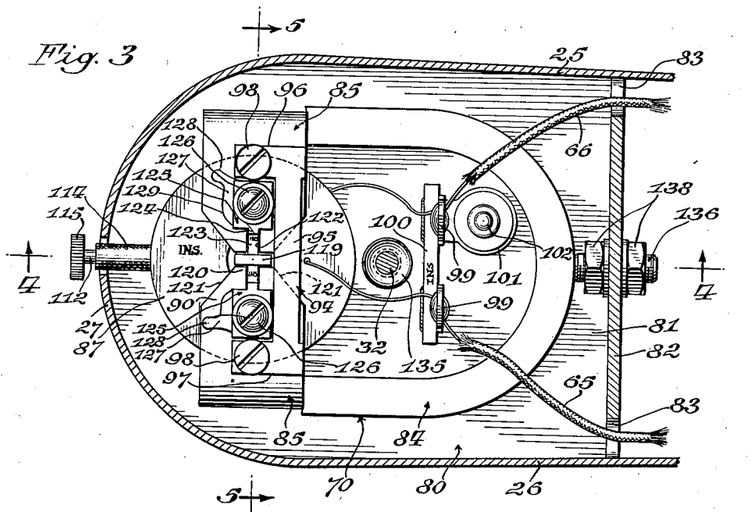
Fig. 3 is an enlarged double size fragmentary sectional view of the pickup of Fig. 2, taken on the plane of the line 3—3 of Fig. 2.
Figure 4:
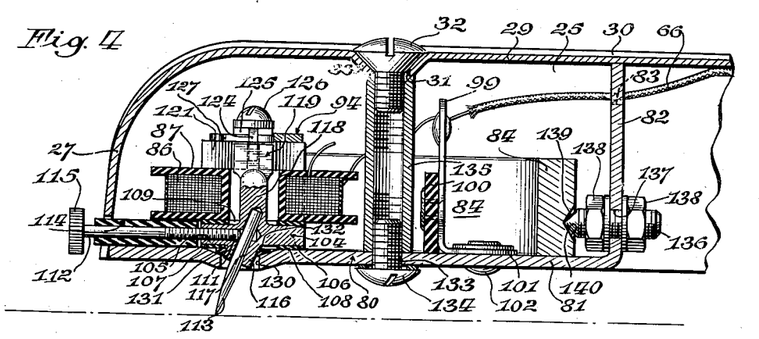
Fig. 4 is a similar vertical sectional view taken on the plane of the line 4—4 of Fig. 3.

Referring to Fig. 1, 20 indicates the shaft for the turntable of an electric phonograph, preferably of the type that is driven by an electric motor and provided with an amplifier, whereby the signals which are picked up from the record 21 on the turntable may be suitably amplified and transmitted to a loud speaker.

The turntable is rotably mounted on the support 22, which may also carry the base 23 of a tone arm 24. The tone arm is shown in full size in Fig. 2 and in vertical section.

The turntable is preferably formed of light metal, such as aluminum or an aluminum alloy, and by a stamping operation, by means of which the tone arm may be formed all in one piece of metal.

The tone arm comprises a relatively long and wide metal shell, having comparatively flat side walls 25, 26, cylindrical end walls 27 and 28, all of these walls being integrally joined to the top 29 by curved portions.

The top is provided with a pair of integral pressed ribs 30, extending from one end to the other end, and diverging for the purpose of ornamentation and reinforcement.

The tone arm preferably tapers from the right to the left in Fig. 1, being smaller at the end which is pivotally supported on the base 23 and larger at the end which carries the pickup, so that the pickup may be disposed at a suitable angle to secure substantially perfect tracking.

The upper wall 29 of the tone arm is provided with an aperture 31 for receiving the screw bolt 32, which is adapted to secure the pickup in place. The aperture 31 may be provided with a pressed formation fitting the tapered lower side of the pressed formation 33.

The tone arm 24 is mounted upon the base 23 for pivotal movement in a horizontal plane and in a vertical plane, and the present construction is particularly adapted to save space and permit the movement of the tone arm to such a position that the lower side of the pickup can be inspected when the needle is being put in the pickup.

The base 23 may comprise a stamped metal member, preferably constructed of steel, and of substantially cup shape, having an open lower end formed by a cylindrical wall 34, the lower edge 35 of which is all in the same plane, except for the groove 36, so that the edge 35 may engage the support 22 to which it is secured by a plurality of screws located in the apertures 37.

The cylindrical wall 34 is integrally joined to an annular radially extending flange 38, which is joined to a frusto-conical wall 39 having a flat top 40. The flat top 40 is provided with a centrally located aperture 41. The aperture 41 is adapted to receive the reduced cylindrical portion 42 of a steel tube 43, having an annular shoulder 43' engaging the lower side of the top 40.

The tube 43 is riveted over above the top 40 so that it is fixedly secured in the aperture 41 and adapted to serve as a bearing for the tone arm trunnion.

The tone arm trunnion may consist of a brass tube 44 adapted to be rotatably mounted in the steel tube 43, and the brass tube 44 is provided at its lower end with a spring washer 45 engaging the end of the bearing 43.

The spring washer 45 is in turn engaged by a split steel spring wire 46, which is engaged in a groove 47 located in the periphery of that portion of the brass tube 44 which projects beyond the end of the bearing 43. At its upper end the brass trunnion 44 is formed with an integral radially projecting flange 48, which is adapted to engage below the tone arm supporting member 49.

The extreme end of the trunnion 44 is riveted over as at 50 above the member 49, which comprises a galvanized steel strip of relatively stiff steel or iron, having an aperture 51. Thus the tone arm supporting member 49 is fixedly riveted to the trunnion 44, and the member 49 is adapted to be pivotally mounted for rotation on a vertical axis.

The radial flange 48 serves as a thrust bearing, engaging the upper end of the bearing 43, and the spring washer 45 serves as a lower thrust bearing, engaging the lower end of the bearing 43. The spring washer 45 is in turn engaged by the split steel wire ring 46, which springs into its groove 47 and holds the parts in assembled relation.

The tone arm supporting member 49 has a central flat body 52 which extends at right angles to the bearing 44, but its forward end is bent up diagonally at 53, so that the end 54 is located in close proximity to the lower side of the top 29 of the tone arm. As shown in Fig. 6, when the tone arm has no needle in it, and it pivots downwardly, the end 54 serves as a stop member for preventing the tone arm from actually engaging a record, the stopping position being shown in dotted lines in Fig. 6.

The opposite end of the tone arm supporting member 49 is bent downwardly slightly at 55 and, as shown in Fig. 7, has laterally projecting bearing lugs 56 oppositely located at each side of that end.

The bearing lugs 56 are suitably upset so that they are provided with substantially frusto-conical formations 57, terminating in cylindrical trunnions 58 adapted to be received in the apertures 59, which are formed in the bearing brackets 60.

The cylindrical trunnions 58 are a substantial fit in the apertures 59 of the bearing brackets, thereby assuring the bearing engagement between the brackets and the supporting member 49, but the bearing brackets 60 are resilient, and they press tightly and resiliently against the frusto-conical surfaces 57 so as to take up all rattling and play; and in the event of any wear on the bearings 59 or trunnions 58, this will be taken up by the resilient engagement of the bearing brackets with the frusto-conical surfaces 57.

The bearing brackets 60 are identical in construction, but are oppositely disposed, and therefore only one need be described in detail.

Each bearing bracket may be constructed of a steel strip having a flat body 61, which flatly engages the inner wall 25 or 26, to which these bodies are riveted by rivets 62. The bearing strips are curved inwardly at 63, and the offset or shoulder is provided with an aperture 64, which serves to support the insulated conductors 65, 66, which connect the pickup in the circuit. The bearing brackets are also provided with the two parallel end portions 67, which have the apertures 59 and serve as bearings.

By virtue of the length and resiliency of these bearing brackets, the parallel end portions 67 press tightly against the frusto-conical part 57 on the tone arm supporting member 49. Thus the tone arm is supported for pivotal movement on a horizontal axis, which is the axis of the trunnions 58.

The rearwardly extending portion 55 of the tone arm supporting member 49 carries the pivotal points 58, back sufficiently beyond the base 34 so that the end wall 28 does not engage the base 23 until the tone arm is pivoted upward to such a position that it is practically vertically disposed. The relation of parts may be such that the tone arm may be lifted to a position slightly past the vertical so that the lower edge at the point 68 may serve as a stop surface engaging the frusto-conical flange 39 to hold the tone arm past its dead center in substantially vertical position.

In this position the pickup may be inspected and the needle may be very conveniently inserted, since the aperture for the needle is readily visible. It is not necessary to try to find the aperture merely by feeling around, as in many of the devices of the prior art, which are so constructed that the tone arm cannot be lifted to a point where the needle aperture is visible. The base and tone arm are so arranged that suitable provision is made for the conductors 65, 66, which may pass in through to the slot 36, up through the bearing tube 44, through the apertures 54, and along the inside of the tone arm to the pickup unit 70.

In order to provide stop means for limiting the rotation or movement of the tone arm 24 about a vertical axis, the tone arm supporting member 49 is provided with a depending pin 141, which is riveted to the member 49 by means of an integral annular flange 142 and a head 143. The pin 141 projects through an arcuate slot 144 in the top wall 40 of the base 23, the slot being better shown in Fig. 7. Thus the engagement of the pin 141 with the ends of the slot 144 determines the amount of movement of the tone arm. This prevents the tone arm from moving over far enough to hit the turntable shaft 20 or so far in the opposite direction that it may run off the turntable.

Referring to Figs. 2 to 5, these illustrations show the use of a pickup 70 of the magnetic type, adapted to be housed in the left end of the tone arm 24. The magnetic pickup is preferably supported upon a supporting plate 80, having a flat lower body 81 and an upwardly turned housing flange 82. The body 81 is substantially rectangular in plan, except that its left end (Fig. 4) is curved to fit the inside of the curved end wall 27.

The housing flange 82 is likewise curved to fit the curvature of the top wall 29, except that it is provided with a pair of partially circular recesses 83 for passing the conductors 65, 66. The plate 80 is preferably made of non-magnetic material, such as, for example, aluminum or aluminum alloy, which is of additional advantage because of its lightness, so that the plate will not short circuit any of the magnetic lines of force of the horseshoe magnet 84.

Figure 5:
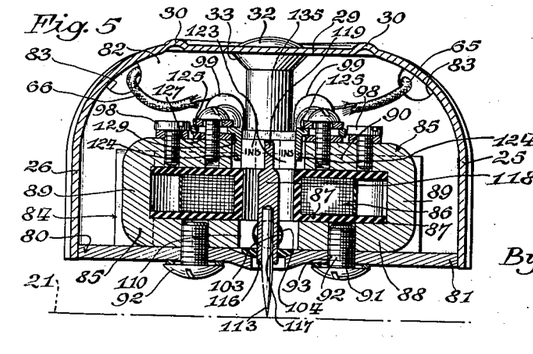
Fig. 5 is a vertical sectional view taken on the plane of the line 5—5 of Fig. 3.

The plate also supports a pair of magnetic core members 85, which serve as pole pieces for the magnet 84, and also serve to embrace the coils 86, preferably carried by a spool 87. The core members 85 are substantially C-shaped, as shown in Fig. 5, when assembled, but when separately considered are each of substantially U shape.

Each core member 85 preferably comprises a lower flat attaching flange 88, an upwardly extending flange 89, and a top flange 90, which is parallel to the lower flange 88. The lower flange 88 has a threaded bore 91 for receiving the screw bolt 92, which passes through an aperture 93 in the supporting plate 80, to which each of the core members 85 are fixedly secured.

The core members 85 are also joined at the top by a yoke plate 94, comprising a flat plate of nonmagnetic metal, having an elongated body 95 and a pair of laterally extending end portions 96, 97, which are provided with apertures for receiving the screw bolts 98, which are threaded into bores in the core members 85. As the core members are secured by screw bolts to the supporting plate 80 at the bottom and they are secured in spaced relation by the yoke 94, and screw bolts 98 at the top, these core members are fixedly secured in predetermined spaced relation to each other at the top and the bottom, and are thus adapted to support the spool 87 and other parts, later to be described.

The spool member may comprise a molded insulating member constructed of insulation, such as a phenolic condensation compound, upon which there is wound the insulated coils 86, within which are generated the oscillating electromotive forces and currents resulting from the movement of the phonograph needle. The two leads from the coils 86 are connected to the connectors 99, which in turn are connected to the conductors 65, 66, carried by the tone arm. The connectors 99 are mounted upon an insulating plate 100, which in turn is secured by a metal bracket 101 and a rivet 102 to the supporting plate 80.

The core members 85 each have their lower flange 88 formed with a partially cylindrical groove 103 so that when these core members are arranged in the position of Fig. 5 the oppositely disposed grooves 103 form a partially cylindrical recess for receiving a chuck 104.

The chuck 104 consists of a member constructed of magnetic metal having a pair of oppositely extending horizontal cylindrical trunnions 105, 106, each of which is provided with a resilient, soft rubber tube 107, 108, serving as a cushion bearing.

The pole pieces 85 are provided with slots at the point 109 between the trunnions 105, 106 of the chuck so that the grooved portions 103 are provided only at the ends of the two laterally projecting legs 110, carried by the lower flange portion 88 of the pole piece 85. Thus the rubber tubes or bearings 107, 108 engage the pole pieces 85, but the central portion of the chuck is left free for movement and does not engage the ends of the core members or pole pieces 85.

The chuck has its trunnion 105 provided with a threaded bore 111 for receiving the clamping screw 112, which in this case is relatively long and is threaded into the bore 111 for clamping the needle 113. In order to insulate the clamping screw 112 from the housing and prevent any possibility of any scraping noises, another rubber tube 114 is mounted on the shank of the clamping screw 112, covering it from a point outside the tone arm to the end of the trunnion 105. The clamping screw 112 is provided with a knurled head 115.

The chuck 104 also has a depending lug 116, which is inclined at a slight angle to the vertical so as to support the needle 113 in a direction extending toward the direction of movement of the record. The lug 116 has an internal bore 117 which communicates with the threaded bore 111 and is adapted to receive the needle 113. The clamping screw 112 thus engages the needle and clamps it in the bore 117.

The chuck 104 is also provided with an upwardly extending lug formation 118, which terminates in a flat or spade-like end 119. The spade-like end 119 is disposed between the ends 120 of the upper flange 90 of the pole pieces 85. These upper flanges 90 are tapered inwardly at 121 on both sides so that the flat end 120 is of substantially the same width as the flat armature 119 carried by the chuck 104. Thus the tapered ends of the pole pieces direct the major portion of the flex toward the armature.

The pole pieces are also provided with inwardly extending slots 122 at the ends 120, and the slots are filled with rectangular rubber blocks 123. Each rectangular rubber block is engaged by the depending flange 124 of a compression bracket 125, which is mounted upon a screw bolt 126 that is threaded into the pole pieces 85.

The screw bolt 126 also rotatably houses a cam member 127 having an outwardly projecting lug 128, and the position of the compression bracket and its depending flange 124 may be very easily adjusted by rotating the cam 127 by means of the lug 128, during which motion the edge 129 of the cam will engage the depending flange 124 and place compression on the rubber block 123.

The rubber block 123 engages the flat armature 119, and the two blocks 123 are adapted to normally support the armature in spaced relation to the ends 120 of both poles. The ends 120 of the pole pieces are spaced sufficiently so as to leave a slight clearance between the armature and the ends of the pole pieces.

In order to eliminate any possibility of engagement between the depending lug 116 of the chuck 104 and the supporting plate 80, the supporting plate is provided with an enlarged rectangular aperture 130 and with a pressed depression 131 for receiving a rectangular rubber pad 132, which has an aperture for receiving the lug 116.

The rubber pad 132 closes the aperture 130 around the chuck and assures clearance for the movement of the chuck without engagement with the supporting plate 80.

The supporting plate 80 is also provided with a centrally located aperture 133 for passing a screw bolt 134, which is threaded into a spacer sleeve 135. The spacer sleeve is thus fixedly secured on the supporting plate and is adapted to receive in its other threaded end the screw bolt 32, previously mentioned.

Thus the plate 80 with its magnetic pickup is fixedly secured in the tone arm 24.

As the supporting plate 80 engages the end wall of the tone arm, the side walls of the tone arm, and the top wall of the tone arm, by means of its spacer sleever 135 and flange 82, it may be secured in place by a single securing screw 32. The permanent magnet 84 may be supported in the pickup assembly by means of a single supporting screw 136, which passes through an aperture 137 in the housing flange 82, and is provided with lock nuts 138 and spring washers on each side of the flange 82.

The screw bolt 136 has a conical end 139 which engages in a corresponding recess 140 in the yoke of the permanent magnet 84. The permanent magnet may be properly located with its ends engaging the sides of the pole pieces 85, and then clamped in that position by the pressure placed upon it with the screw bolt 136. The head of the screw bolt 136 being located in a recess positively prevents movement of its end of the magnet and the opposite end of the magnet is held by friction and magnetic force. The pole pieces 85 are thus magnetized by the permanent magnet and for practical purposes become a part of the permanent magnet, while thus assembled. The yoke 94 being constructed of non-magnetic metal, it does not short circuit the flux of the magnet.

The operation of the electromagnetic pickup will be evident from the preceding description.

The needle 113 is vibrated in a lateral direction due to the recorded irregularities in the record, and thus the armature 119 is correspondingly oscillated. The armature 119 being disposed in the magnetic field between the pole pieces 85, its movement causes variations and changes in the position of the flux which causes the magnetic lines of force to cut the electrical coils 86 and produce electrical oscillations in the coils which are transmitted through the conductors 65, 66.

Referring to Figs. 8–11, these are views of a modified form of tone arm which is provided with a crystal pickup. The same tone arm housing 24 may be combined with a crystal pickup 145, and due to the smaller size of the crystal pickup unit 145, with respect to the relatively wide tone arm housing, the crystal pickup may be disposed at such an angle as to secure substantially perfect tracking.

Figure 15:
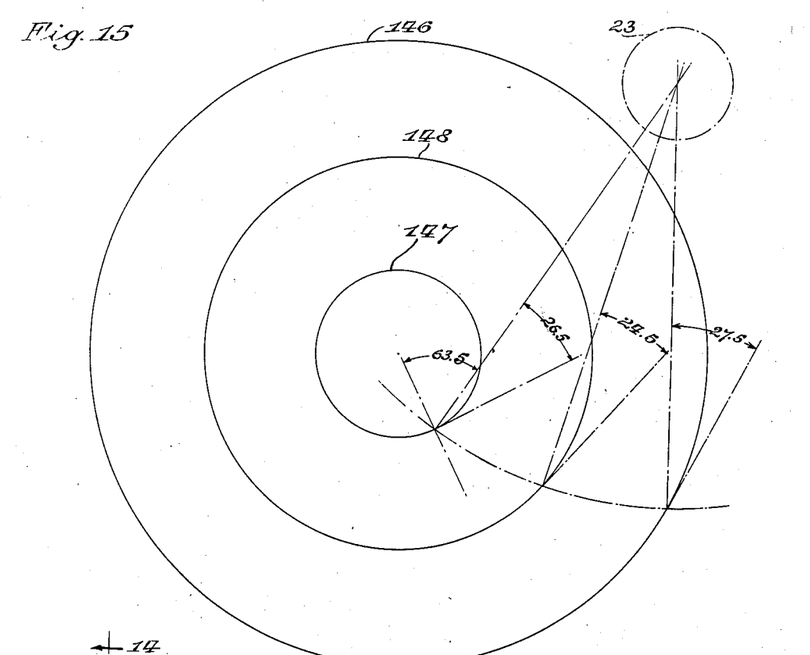
Fig. 15 is a diagrammatic top plan view of the turntable, showing the location of parts of the record, turntable, and tone arm support, for the purpose of securing substantially perfect tracking.

Referring to Fig. 15, this is a diagrammatic illustration of the illustration in which 146, the outer circle, indicates the outermost groove of the record-starting groove, and 147 the innermost groove of the record. Starting and stopping grooves may be located beyond the grooves 146 and groove 147, as it is not necessary to consider the location of those grooves in providing for perfect tracking. The circle 148 is midway between the circles 147 and 146, and since it is impossible to make the angle of the needle perfect at all points on the record, a point midway between the innermost groove and outermost groove represented by the circle 148 may be selected for perfect tracking.

With a straight arm and the needle point passing through the center, the tracking is never perfect and may vary from 7% at the inner circle to 14% at the mid circle and 20.5% at the outer circle. This may be corrected by using an offset head or by arranging the pickup unit at an angle, which secures perfect tracking at the average center-recorded groove 148; and the proper angle for the axis of the pickup unit is that at which this axis is tangential to the average center-recorded groove 148. The variation of the angle from that necessary for perfect tracking between the inner groove and the outer groove will then be at a minimum.

Figure 8:
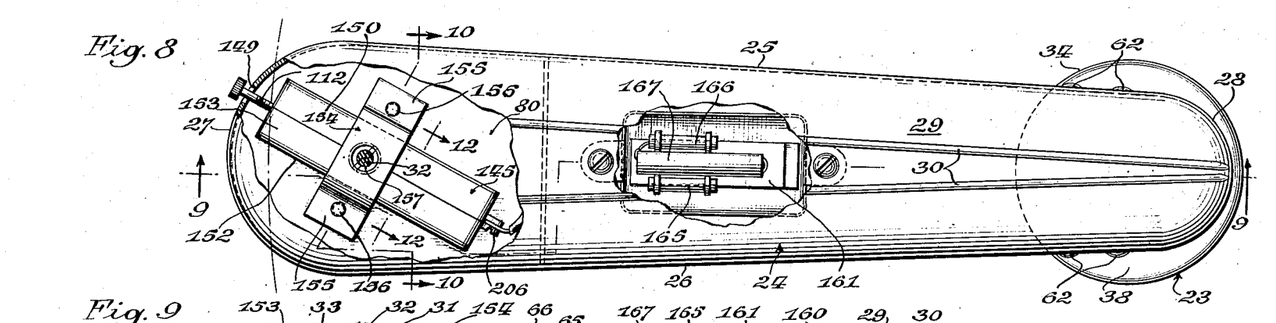
Fig. 8 is a full size, top plan view of a tone arm of the type of Fig. 1, provided with a crystal pickup, parts of the tone arm being broken away to show the interior structure.

Thus the pickup unit 145 is disposed within the tone arm housing 24 in Fig. 8 at such an angle that its axis is tangential to the average center-recorded groove. The end wall 27 of the tone arm 24 is provided with an aperture 149 which is suitably located for the clamping screw 112 when the pickup unit 145 is so arranged. The pickup unit 145 is substantially rectangular in end elevation, as shown in Fig. 10, and its flat sides 150–153 may be engaged by the U-shaped bracket 154 and by the supporting plate 80 so that the crystal unit is clamped to the supporting plate.

The U-shaped bracket 154 has laterally turned attaching flanges 155, which have threaded bores for receiving the screw bolts 156 passing through the supporting plate 80. U-shaped bracket 154 may also have a threaded bore 157 in its yoke for receiving the screw bolt 32, which secures the complete pickup assembly to the tone arm.

Figures 9, 10, 11:
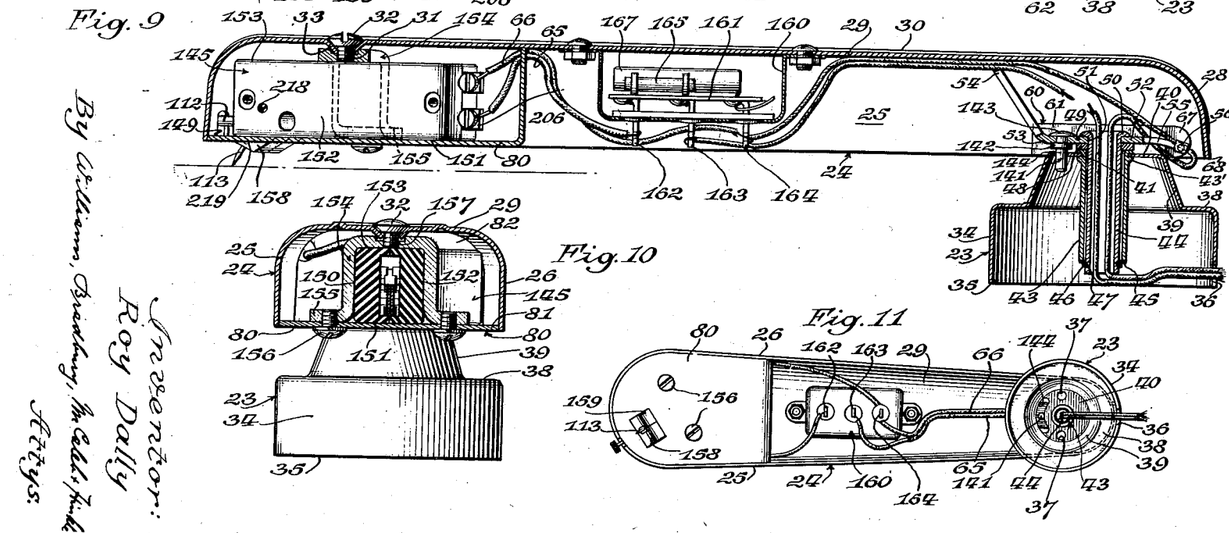
Fig. 9 is a vertical sectional view, taken on the plane of the line 9—9 of Fig. 8, looking in the direction of the arrows.
Fig. 10 is a vertical sectional view, taken on the plane of the line 10—10 of Fig. 8, looking in the direction of the arrows.
Fig. 11 is a bottom plan view of the pickup of Fig. 8.

In the particular embodiment of pickup unit 145, illustrated in Figs. 8 and 9, the pickup unit is provided with an integral depending lug formation 158, surrounding the needle 113, and therefore the supporting plate 80 has a corresponding rectangular aperture 159 for receiving this lug.

The lug 158 provides additional means for securing the crystal pickup unit 145 in place on the plate 80.

In addition to the pickup unit 145, the tone arm 24 also preferably supports a filter unit comprising the housing 160 and insulating support 161, connectors 162–164, and the resistance members 165, 166, as well as a condenser 167. Proper connections with the conductors 65, 66 are in this case made through the connectors 162–164, as shown in Fig. 11, according to the circuits further to be described.

Figure 21:
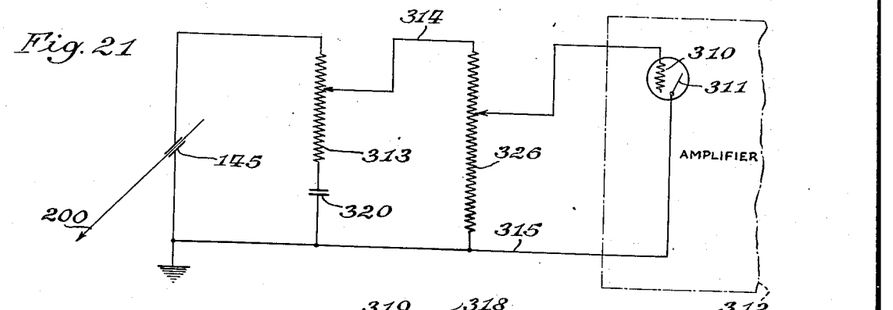
Fig. 21 is another wiring diagram, showing another mode of installation of the crystal pickups.

The connections for this particular type of filter are shown in Fig. 21. Various types of electromagnetic and crystal pickup units may be employed, such as those disclosed by my prior aplications, Ser. No. 102,303, Pickups, or Ser. No. 186,049, Pickups, and the disclosures of said applications are hereby incorporated by reference thereto.

Figures 12, 13:
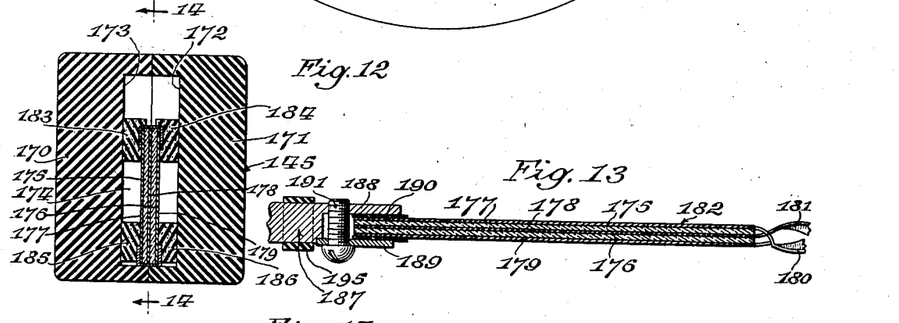
Fig. 12 is a vertical sectional view, taken on the plane of the line 12—12 of Fig. 8, looking in the direction of the arrows, showing certain details of construction of the pickup.
Fig. 13 is a fragmentary horizontal sectional view, taken on the plane of the line 13—13 of Fig. 14, showing details of the construction of the pickup.
Figure 14:
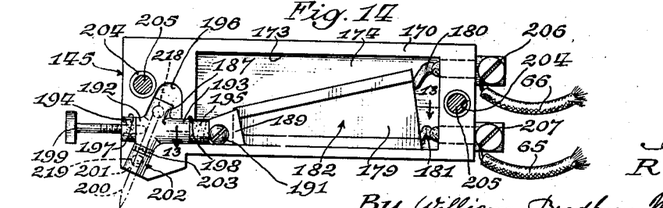
Fig. 14 is a vertical sectional view, taken through the pickup of Fig. 12, on the plane of the line 14—14, looking in the direction of the arrows.

Referring to Figs. 12–14, these are views showing the construction of the crystal pickup unit 145. The crystal pickup unit, which is indicated in its entirety by the numeral 145 (Fig. 12) may be provided with a supporting housing consisting of a pair of housing members 170 and 171 of molded insulating material, such as a phenolic condensation compound, each half of the housing being provided with a similar recess 172, 173, so that the two recesses together form a chamber 174 for the crystal unit.

Figures 16, 17:
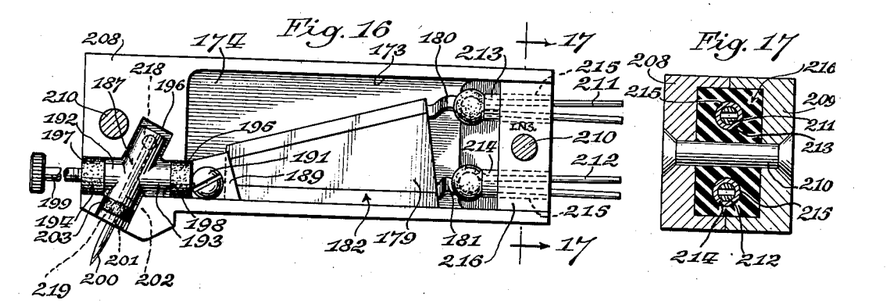
Fig. 16 is a view similar to Fig. 14 of a modified form of a crystal pickup.
Fig. 17 is a sectional view similar to Fig. 16, taken on the line 17—17, looking in the direction of the arrows.

The crystal unit, Fig. 13, may consist of a plurality of trapezoidal plates 175, 176 of suitable crystals, such as Rochelle salts, having layers of metallic foil 177, 178, 179 between the plates and on the outsides thereof, the two outer layers of tin foil being connected to a lead 180, and the central foil 178 having lead 181. The foil and crystals are cemented together with a suitable cement, such as the Rochelle salts, and are covered with an outer layer of foil to protect the crystals from moisture. The right end (Fig. 17) of the crystal unit 182 may be clamped between the halves 170, 171 of the housing by a plurality of resilient blocks 183–186, and the left end (Figs. 13 and 14) may be secured to the chuck 187, being clamped between the two metallic plates 188, 189 with a rubber cushion 190, engaging the crystal unit 182.

The screw bolt 191, which is threaded into the plate 188, may be varied to change the response of the crystal unit 182, and the crystal unit 182 is adapted to generate an electromotive force when it is subjected to operation. For this purpose the crystals 175, 176 must be cut on a suitable axis, after the manner described in the prior patent to C. B. Sawyer No. 1,802,782, issued April 28, 1931, on Piezo-electric device.

The chuck 187 comprises a metal member formed of die cast metal having a pair of horizontally extending trunnions 192, 193, which are provided with rubber tubes 194, 195, serving as resilient bearings, and sealing the unit 145 against the entrance of moisture. The housing halves 170, 171 are formed with a suitable chamber 196 for the chuck, and with the hemi-cylindrical bearing grooves 197, 198 for the rubber tubes 194, 195, which are resiliently clamped by the halves 170, 171 when the halves of the housing are secured together.

The trunnion 192 has a threaded bore for receiving the screw bolt 199, which clamps the needle 200 in a needle bore 201 that communicates with the bore for the screw 199. The needle supporting portion 202 of the chuck may also be provided with a rubber tube 203 fitting in a suitable groove in the housing 170, 171 to seal this part of the housing against the entrance of moisture. The two halves of the housing may be secured together by bolts or rivets 204, tubular rivets being preferred so that the bolts 205 may pass through the rivets and be used for securing the pickup unit 145 to the tone arm, if desired.

At the opposite end, the housing halves 170, 171 are provided with suitable connectors 206, 207, to which the leads 65, 66 from the pickup unit may be secured. These connectors 206 comprise metallic members with suitable screws, and they may be held in either half of the housing 170, 171.

Referring to Figs. 16–19, these figures show additional views of pickup units constructed by me in which the half housing members 208, 209 were constructed of metal, such as die cast metal secured together by bolts or rivets 210. In this case the mode of support of the chuck and the crystal unit is substantially the same as previously described, except that the connectors must be insulated from the housing. For example, in Fig. 17, the connectors may comprise cotter-pins 211, 212, carried by metallic tubes 213, 214, and having the heads of the cotter-pins soldered to the leads 180, 181.

The tubes 213, 214 have a frictional fit in the bores 215 in an insulating block 216. The right end of the housing halves 208, 209 has the chamber 174 open to receive the insulating block 216, which is secured in place by virtue of the fact that the bolt or rivet 210 passes not only through the housing halves 208, 209 (Fig. 17), but also through the insulating block 216.

Figures 18, 19:
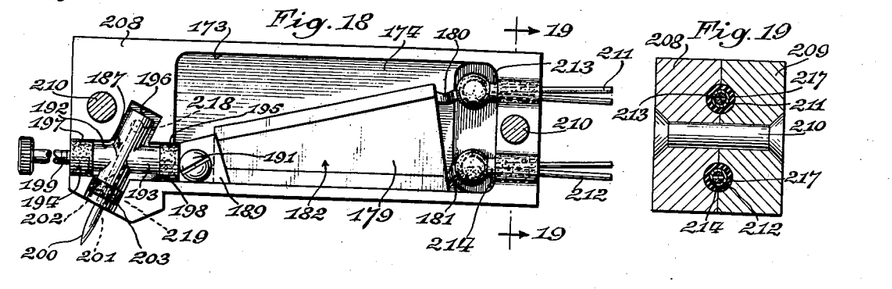
Fig. 18 is a sectional view similar to Fig. 14 of another modification.
Fig. 19 is a sectional view, taken on the plane of the line 19—19 looking in the direction of the arrows.

In Figs. 18 and 19, the metallic sleeves 213, 214 are covered with rubber sleeves 217, which are likewise clamped between the two metallic housing halves 208, 209.

Referring again to Figs. 14, 16 and 18, the circles 218, 219 indicate resilient rubber blocks contained in complementary bores in the housing halves 170, 171, 208, 209, and engaging the opposite sides of the chuck above and below the trunnions 192, 193.

These rubber blocks may, in turn, be engaged by adjustable screws in the housing halves 170, 171, the adjustable screws having their slotted heads accessible outside the crystal pickup unit so that the resilient pressure of the rubber blocks 218, 219 on the chuck may be adjusted to vary its response to the needle 200.

Referring to Figs. 20-23, these are diagrammatic views showing the connection of the crystal pickups in circuits, including an amplifier. In each of these views the crystal pickup is indicated by the number 145 and the needle by the number 200. The leads from the crystal pickup are 180 and 181. 310 indicates the grid of one of the tubes of the amplifier 312. 311 indicates the plate thereof.

It should be understood that these are fragmentary diagrams and that the other elements of the complete wiring diagram will be evident to one skilled in the art.

Figure 20:
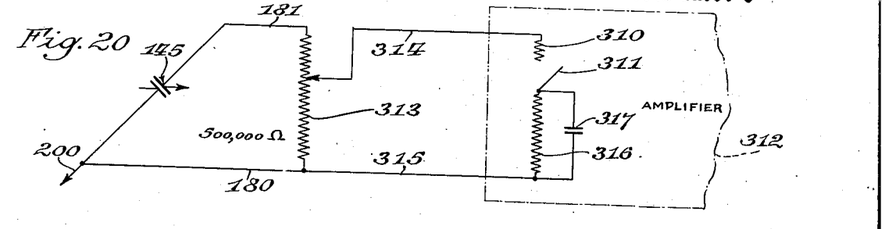
Fig. 20 is a wiring diagram, showing one mode of installation of the crystal pickups, constructed according to the present invention.

In Fig. 20 the leads 180, 181 are connected to a high resistance potentiometer 313, such as, for example, 500,000 ohms. The variable arm 314 of the potentiometer is connected to the grid 310. The opposite or fixed end of the potentiometer is connected by lead 315 to the filter, which comprises the resistance or impedance 316 and condenser 317 connected in parallel, the opposite end of the filter being connected to the plate 311.

In Fig. 21, the potentiometer 313 maintains a constant impedance circuit with condenser 320 and crystal pickup 145. It is identical to Fig. 23, later to be described, as a high fidelity filter. However, when the arm of potentiometer 313 is moved, inserting more or less resistance in series with lead 314, it becomes a very effective tone control, adjusting the high frequency response to any desired value. Potentiometer 326 is the customary volume control.

Figure 22:
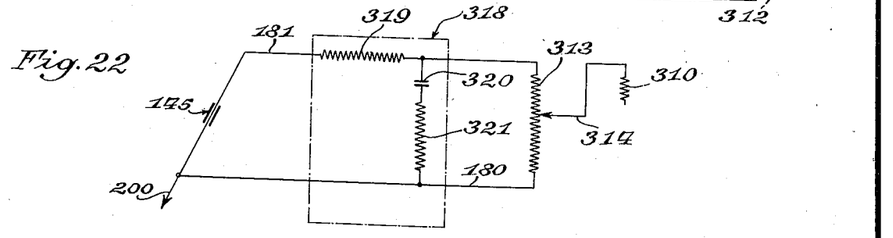
Fig. 22 is a fragmentary wiring diagram, showing another modified form of installing crystal pickups.

Referring to Fig. 22, this is another embodiment in which the filter unit enclosed in the housing 318 comprises the series impedance 319 connected in the lead 181 and a condenser 320 and impedance 321 which is connected across the leads 180, 181 beyond the impedance 319.

Figure 23:
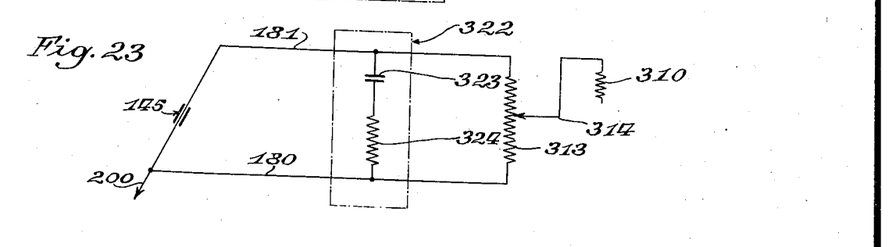
Fig. 23 is another fragmentary wiring diagram, illustrating a mode of installing crystal pickups.
Figure 24:
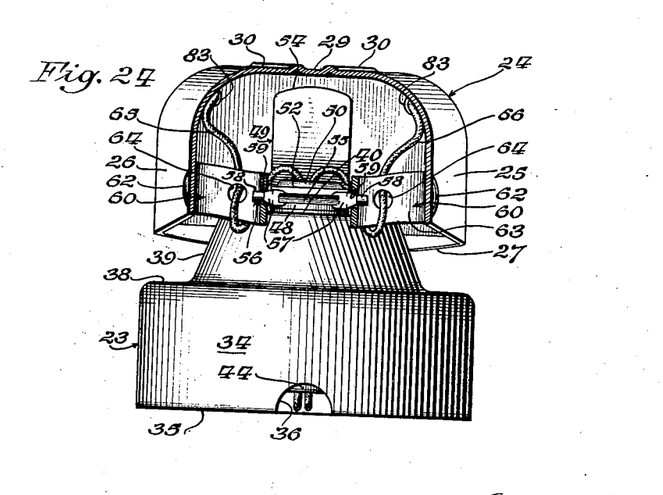
Fig. 24 is a vertical section on a plane passing through pivots of the tone arm.

Referring to Fig. 23, in this embodiment the filter unit 322 merely comprises a condenser 323 and impedance 324 connected across the leads 180, 181.

The various filters are used in different installations to secure a high fidelity response, and should not be used after the volume control. The volume control should be a 500,000 ohm potentiometer connected with the constant impedance side to the pickup, for the best results. 500,000 ohms resistance gives a greater than normal bass response, but a normal bass response can be secured with a 200,000 ohm resistance. The impedance of the crystal pickup at 100 cycles is 300,000 ohms, and the voltage output is approximately 1.6 volts.

By means of the foregoing circuits and pickups, circuits and tone arms, arrangements may be made for various sizes of records, with or without volume control, and for high fidelity response. Practically perfect tracking can be secured, and the needle noises may be filtered out by means of these filters.

The tone arms permit lifting of the pickup end to such a height that the needle aperture is clearly visible and so that the needle may be very easily inserted, thereby saving much time and trouble in the insertion of needles. The pickup unit and tone arm may be made very light so as to reduce the inertia and thereby reduce the wear on records due to the weight placed on the needle in the devices of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a tone arm, the combination of an elongated, downwardly open, stamped sheet metal shell, having an upper wall, side walls, and end walls of predetermined size, with an electrical pick-up unit at one end of said shell, and means for supporting the other end of said shell for substantially universal movement, said pick-up being disposed at an angle to the major axis of said tone arm, and said tone arm being provided with an aperture for receiving a pick-up needle screw, and means for securing said pick-up in said tone arm, and a housing member comprising a pair of flanges at right angles to each other, said flanges being provided with end portions, one end portion fitting inside the end of the shell, and the other end portion fitting inside the body of the shell, and means for securing said housing member to said shell to enclose the pick-up unit, said housing member having an aperture for protrusion of a needle carried by said pick-up.

2. In a tone arm, the combination of an elongated, downwardly open, stamped sheet metal shell, having an upper wall, side walls, and end walls of predetermined size, with an electrical pick-up unit at one end of said shell, and means for supporting the other end of said shell for substantially universal movement, said pick-up being disposed at an angle to the major axis of said tone arm, and said tone arm being provided with an aperture for receiving a pick-up needle screw, and means for securing said pick-up in said tone arm, and a housing member comprising a pair of flanges at right angles to each other, said flanges being provided with end portions, one end portion fitting inside the end of the shell, and means for securing said housing member to said shell to enclose the pick-up unit, said housing member having an aperture for protrusion of a needle carried by said pick-up, said pick-up comprising an electric magnetic pick-up and resilient rubber surrounding said needle screw and surrounding a needle chuck which forms a part of said pick-up.

3. In a tone arm, the combination of a crystal pickup unit with a metal shell, said crystal pick-up unit being of such size with respect to the metal shell that it may be arranged at a substantially perfect tracking angle when the tone arm is mounted with respect to a turntable, said metal shell having a pair of rearwardly extending bearing brackets of resilient material provided with apertures, and a base having trunnions for reception in said apertures, said trunnions and apertures being located adjacent the extreme lower and outer corner of said shell, whereby the tone arm may be lifted until the lower surface of the pickup is visible.

4. In a tone arm, the combination of a crsytal pickup unit with a metal shell, said crystal pick-up unit being of such size with respect to the metal shell that it may be arranged at a substantially perfect tracking angle when the tone arm is mounted with respect to a turntable, a tone arm base comprising a cup-shaped metal member, a tube fixedly carried by said base, and a tubular bearing member for carrying said tone arm, said tubular bearing member being mounted in the first-mentioned tube for rotation about a vertical axis, said bearing member fixedly carrying a tone arm supporting member at its upper end, bearings carried by said tone arm, and trunnions carried by said tone arm supporting member, said bearings and trunnions being located adjacent the lower rear corner of the tone arm shell, said tone arm supporting member having an upwardly extending flange on the side opposite said trunnions, providing a stop engaging said shell to hold the tone arm when the needle has been removed from the pickup.

5. In a tone arm, the combination of a crystal pickup unit with a metal shell, said crystal pickup unit being of such size with respect to the metal shell that it may be arranged at a substantially perfect tracking angle when the tone arm is mounted with respect to a turntable, a tone arm base comprising a cup-shaped metal member, a tube fixedly carried by said base, and a tubular bearing member for carrying said tone arm, said tubular bearing member being mounted in the first-mentioned tube for rotation about a vertical axis, said bearing member fixedly carrying a tone arm supporting member at its upper end, bearings carried by said tone arm, and trunnions carried by said tone arm supporting member, said bearings and trunnions being located adjacent the lower rear corner of the tone arm shell, said tone arm supporting member having a depending pin and said base having an arcuate slot for receiving said pin whereby the rotational motion of the tone arm about a vertical axis is limited.

6. In a tone arm, the combination of a crystal pickup unit with a metal shell, said crystal pickup unit being of such size with respect to the metal shell that it may be arranged at a substantially perfect tracking angle when the tone arm is mounted with respect to a turntable, a tone arm base comprising a cup-shaped metal member, a tube fixedly carried by said base, and a tubular bearing member for carrying said tone arm, said tubular bearing member being mounted in the first-mentioned tube for rotation about a vertical axis, said bearing member fixedly carrying a tone arm supporting member at its upper end, bearings carried by said tone arm, and trunnions carried by said tone arm supporting member, said bearings and trunnions being located adjacent the lower rear corner of the tone arm shell, the bearings on said tone arm being formed in resilient bearing brackets, and said trunnions having cylindrical bodies and frusto-conical portions engaging said bearing brackets whereby any wear is taken up by the resilient bearing brackets.

7. In a magnetic pickup for tone arms, the combination of a non-magnetic supporting plate having a flat body flange and a transversely extending flange with a pair of U-shaped pole piece members arranged with the legs of the pole pieces extending toward each other and embracing the insulating coils carried by a spool, means for securing said pole pieces to the supporting plate, and means for securing the opposite ends of the pole pieces in spaced relation to each other, said pole pieces having the legs which are adjacent said plate formed with a partially cylindrical groove to provide a pair of spaced bearings, a needle chuck having a bore for receiving a needle, and having a pair of oppositely extending trunnions provided with rubber sleeves located in said bearings, said chuck having an upwardly extending armature located between the other legs of said pole pieces and a permanent electromagnet of substantially U-shape, having its ends engaging the sides of said pole pieces and means carried by said transversely extending flange for urging said permanent magnet against said pole pieces.

8. In a magnetic pickup for tone arms, the combination of a non-magnetic supporting plate having a flat body flange and a transversely extending flange with a pair of U-shaped pole piece members arranged with the legs of the pole pieces extending toward each other and embracing the insulating coils carried by a spool, means for securing said pole pieces to the supporting plate, and means for securing the opposite ends of the pole pieces in spaced relation to each other, said pole pieces having the legs which are adjacent said plate formed with a partially cylindrical groove to provide a pair of spaced bearings, a needle chuck having a bore for receiving a needle, and having a pair of oppositely extending trunnions provided with rubber sleeves located in said bearings, said chuck having an upwardly extending armature located between the other legs of said pole pieces and a permanent electromagnet of substantially U-shape, having its ends engaging the sides of said pole pieces and means carried by said transversely extending flange for urging said permanent magnet against said pole pieces, said latter means comprising a set screw provided with lock nuts and having a pointed end adapted to be received in a recess in said yoke.

9. In a magnetic pickup for tone arms, the combination of a non-magnetic supporting plate having a flat body flange and a transversely extending flange with a pair of U-shaped pole piece members arranged with the legs of the pole pieces extending toward each other and embracing the insulating coils carried by a spool, means for securing said pole pieces to the supporting plate, and means for securing the opposite ends of the pole pieces in spaced relation to each other, said pole pieces having the legs which are adjacent said plate formed with a partially cylindrical groove to provide a pair of spaced bearings, a needle chuck having a bore for receiving a needle, and having a pair of oppositely extending trunnions provided with rubber sleeves located in said bearings, said chuck having an upwardly extending armature located between the other legs of said pole pieces and a permanent electromagnet of substantially U-shape, having its ends engaging the sides of said pole pieces and means carried by said transversely extending flange for urging said permanent magnet against said pole pieces, said pickup having blocks of resilient rubber disposed between the ends of the pole pieces and said armature, and holding said armature in a middle position between said pole pieces, and adjustable means carried by said pole pieces for engaging said blocks and adjusting the pressure placed thereon against said armature.

ROY DALLY.